United States Patent
Mircescu

(10) Patent No.: US 10,862,854 B2
(45) Date of Patent: Dec. 8, 2020

(54) SYSTEMS AND METHODS FOR USING DNS MESSAGES TO SELECTIVELY COLLECT COMPUTER FORENSIC DATA

(71) Applicant: Bitdefender IPR Management Ltd., Nicosia (CY)

(72) Inventor: Daniel A. Mircescu, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

(21) Appl. No.: 16/405,140

(22) Filed: May 7, 2019

(65) Prior Publication Data

US 2020/0358738 A1    Nov. 12, 2020

(51) Int. Cl.
*H04L 29/06* (2006.01)
*H04L 29/12* (2006.01)
*H04L 12/46* (2006.01)

(52) U.S. Cl.
CPC ...... *H04L 61/1511* (2013.01); *H04L 12/4633* (2013.01); *H04L 61/2007* (2013.01); *H04L 61/6013* (2013.01); *H04L 63/0272* (2013.01); *H04L 63/1491* (2013.01)

(58) Field of Classification Search
CPC ............. H04L 61/1511; H04L 12/4633; H04L 61/2007; H04L 61/6013; H04L 63/0272; H04L 63/1491
See application file for complete search history.

(56) References Cited

U.S. PATENT DOCUMENTS

| | | |
|---|---|---|
| 5,500,897 A | 3/1996 | Hartman |
| 8,220,031 B2 | 7/2012 | Leterrier et al. |
| 8,260,914 B1 | 9/2012 | Ranjan |
| 8,327,448 B2 | 12/2012 | Eldar et al. |
| 8,576,845 B2 | 11/2013 | Csaszar et al. |
| 8,763,117 B2 | 6/2014 | Carothers |
| 9,325,735 B1 | 4/2016 | Xie et al. |
| 9,455,909 B2 | 9/2016 | Parla et al. |
| 9,819,696 B2 | 11/2017 | Minea et al. |
| 9,912,630 B2 | 3/2018 | Chan et al. |
| 2012/0084860 A1 | 4/2012 | Cao et al. |
| 2012/0254996 A1 | 10/2012 | Wilbourn et al. |

(Continued)

OTHER PUBLICATIONS

Brumley et al., "Automatically identifying trigger-based behavior in malware," Botnet Detection, Series vol. 36, pp. 65-88, Springer US, Jan. 2008.

(Continued)

*Primary Examiner* — Viet D Vu
(74) *Attorney, Agent, or Firm* — Law Office of Andrei D Popovici, PC

(57) ABSTRACT

Described systems and methods allow a selective collection of computer security data from client devices such as personal computers, smartphones, and Internet of Things (IoT) devices. A security application executing on each client device comprises a domain name service (DNS) proxy that tags outgoing DNS messages with a client ID. The DNS server selects a client for to data collection by returning a DNS reply comprising a service activation flag. Some embodiments thus enable a per-DNS-message selectivity of data collection. In some embodiments, subsequent network access requests by the selected clients are re-routed to a security server for analysis.

20 Claims, 10 Drawing Sheets

(56) References Cited

U.S. PATENT DOCUMENTS

| | | | |
|---|---|---|---|
| 2014/0310811 A1 | 10/2014 | Hentunen | |
| 2014/0344917 A1* | 11/2014 | Parla | H04L 63/0272 726/15 |
| 2015/0381570 A1* | 12/2015 | Martini | H04L 63/0471 726/12 |
| 2016/0036848 A1 | 2/2016 | Reddy et al. | |
| 2017/0171146 A1 | 6/2017 | Sharma et al. | |
| 2019/0052658 A1* | 2/2019 | Clarke | H04L 61/1511 |
| 2019/0097965 A1 | 3/2019 | Linari et al. | |

OTHER PUBLICATIONS

Crandall et al., "Temporal search: Detecting hidden malware timebombs with virtual machines," ACM Sigplan Notices, vol. 41. No. 11, pp. 25-36, ACM, New York, NY, USA, Oct. 2006.

Stack Overflow, "Regular expression for matching HH:MM time format," https://stackoverflow.com/questions/7536755/regular-expression-for-matching-hhmm-time-format, Stack Exchange Network, New York, USA, Sep. 2011-Apr. 2015.

Kolbitsch et al., "Inspector Gadget: Automated Extraction of Proprietary Gadgets from Malware Binaries," IEEE Symposium on Security and Privacy, Piscataway, NJ, USA, May 2010.

European Patent Office, International Search Report and Written Opinion dated Dec. 15, 2016 for PCT International Application No. PCT/EP2016/076343, international filing date Nov. 2, 2016, priority date Nov. 4, 2015.

USPTO, Office Action dated Apr. 6, 2017 for U.S. Appl. No. 14/932,765, filed Nov. 4, 2015.

European Patent Office, International Search Report and Written Opinion dated Sep. 29, 2020 for PCT International Application No. PCT/EP2020/068644, international filing date Jul. 2, 2020, priority date May 7, 2019.

* cited by examiner

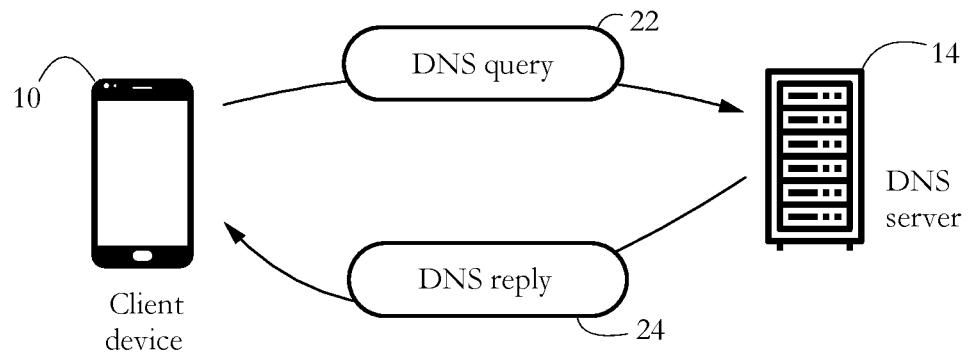
FIG. 2-A (Prior Art)
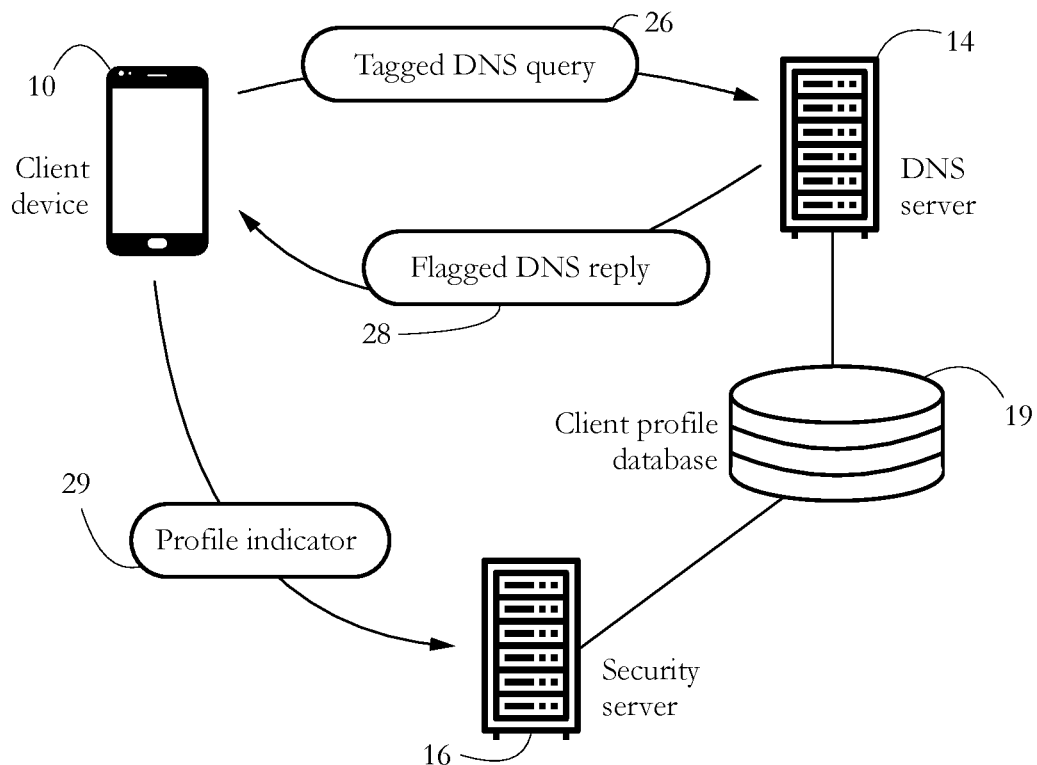
FIG. 2-B

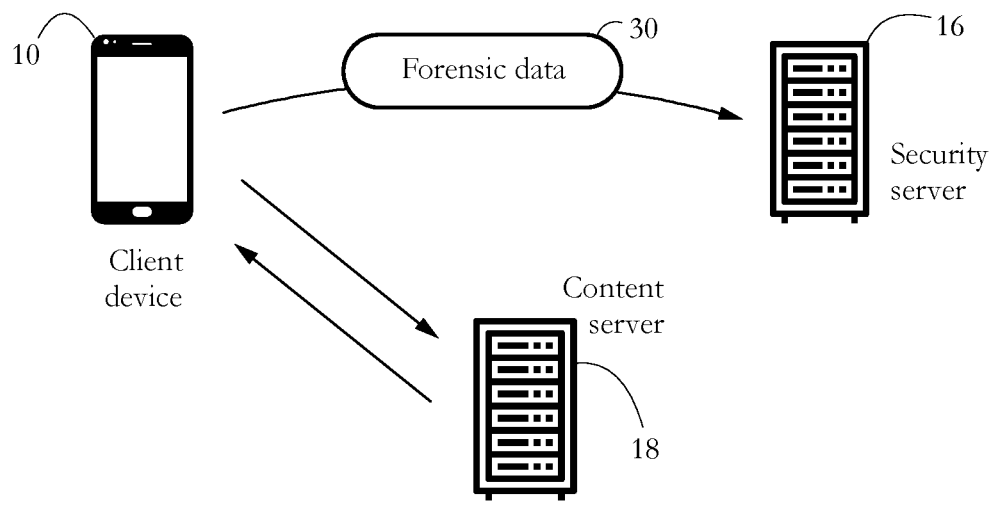
FIG. 5-A
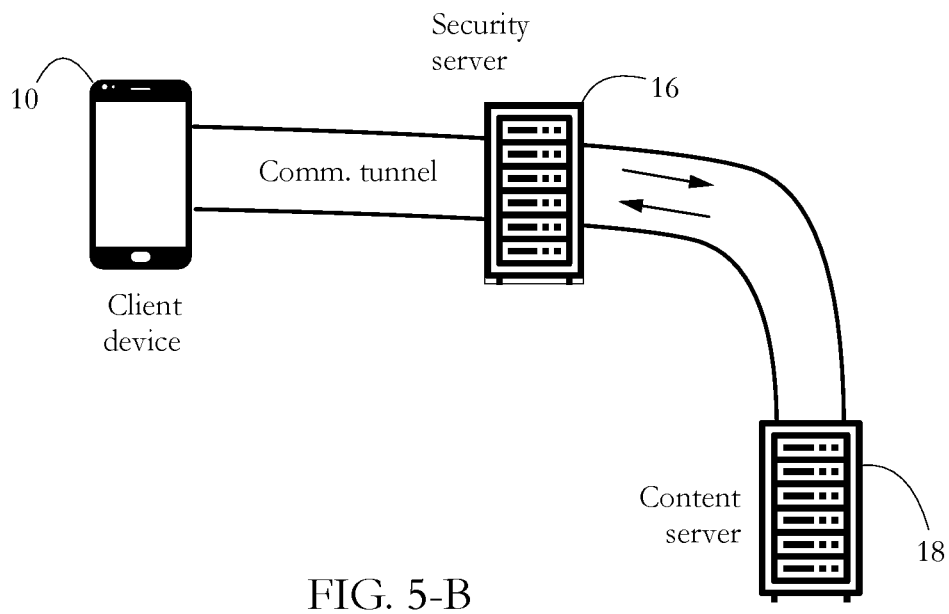
FIG. 5-B

US 10,862,854 B2

SYSTEMS AND METHODS FOR USING DNS MESSAGES TO SELECTIVELY COLLECT COMPUTER FORENSIC DATA

BACKGROUND

The invention relates to systems and methods for fighting malicious software, and in particular, to selectively collecting network traffic samples for forensic analysis.

Malicious software, also known as malware, affects a great number of computer systems worldwide. In its many forms such as computer viruses, Trojan horses, spyware, and ransomware, malware presents a serious risk to millions of computer users, making them vulnerable to loss of data and sensitive information, to identity theft, and to loss of productivity, among others.

A great variety of devices informally referred to as the Internet of Things (IoT) are increasingly being connected to communication networks and the Internet. Such devices include, among others, smartphones, smartwatches, TVs and other multimedia devices, game consoles, home appliances, and various home sensors such as thermostats. As more such devices go online, they become exposed to security threats like malware and intrusion. Therefore, there is an increasing need of securing such devices against malware, as well as of protecting communications to and from such devices. A particular area wherein interest has been renewed by the advent of the Internet of Things includes access control applications, for instance parental control and preventing confidential information from being transmitted via IoT devices.

Malicious software is constantly evolving, challenging computer security providers to keep up with an ever-changing threat landscape. A part of this effort is directed at the timely discovery and analysis of emerging malware. One particular category of anti-malware methods, usually known as behavioral detection, relies on monitoring the activity of a device and/or software component according to a set of rules. Some activity patterns (e.g., sequences of hardware or software events) correspond to normal, legitimate uses of the respective device, whereas others may indicate malice. Reliable identification of abnormal, malware-indicative behavior patterns typically requires a sufficient amount of forensic data harvested from infected devices. In the case of detecting malware-indicative data traffic, learning such patterns may require having access to the network traffic to and/or from infected IoT devices. However, in the case of emerging yet-unknown threats, the offender devices are not easily identifiable.

There is therefore considerable interest in developing systems and methods of collecting forensic data from a variety of device types, and in particular, of selectively collecting network traffic to and/or from IoT devices.

SUMMARY

According to one aspect, a method comprises employing at least one hardware processor of a computer system to intercept a domain name service (DNS) reply message received at the computer system, the DNS reply message comprising a target internet protocol (IP) address indicating a network location of a remote resource, the DNS reply message further comprising a service activation flag. The method further comprises employing at least one hardware processor of the computer system to determine according to a value of the service activation flag whether a security service is active, and in in response, if the service activation flag indicates that the security service is active, to modify the DNS reply message by replacing the target IP address with a dummy IP address. The method further comprises employing at least one hardware processor of the computer system to intercept an electronic communication directed towards a destination IP address, to determine whether the destination IP address matches the dummy IP address, and in response to determining whether the destination IP address matches the dummy IP address, if the destination IP address matches the dummy IP address, to perform a computer security procedure according to the electronic communication. The method further comprises employing at least one hardware processor of the computer system, in response to determining whether the destination IP address matches the dummy IP address, if the destination IP address does not match the dummy IP address, to forward the electronic communication to the destination IP address.

According to another aspect, a computer system comprises at least one hardware processor configured to execute a domain name service (DNS) proxy and a communication manager. The DNS proxy is configured to intercept a domain name service (DNS) reply message received at the computer system, the DNS reply message comprising a target internet protocol (IP) address indicating a network location of a remote resource, the DNS reply message further comprising a service activation flag. The DNS proxy is further configured to determine according to a value of the service activation flag whether a security service is active, and in response, if the service activation flag indicates that the security service is active, to modify the DNS reply message by replacing the target IP address with a dummy IP address. The communication manager is configured to intercept an electronic communication directed towards a destination IP address, to determine whether the destination IP address matches the dummy IP address, and in response, if the destination IP address matches the dummy IP address, to perform a computer security procedure according to the electronic communication. The communication manager is further configured, in response to determining whether the destination IP address matches the dummy IP address, if the destination IP address does not match the dummy IP address, to forward the electronic communication to the destination IP address.

According to another aspect, a non-transitory computer-readable medium stores instructions which, when executed by at least one hardware processor of a computer system, cause the computer system to form a domain name service (DNS) proxy and a communication manager. The DNS proxy is configured to intercept a domain name service (DNS) reply message received at the computer system, the DNS reply message comprising a target internet protocol (IP) address indicating a network location of a remote resource, the DNS reply message further comprising a service activation flag. The DNS proxy is further configured to determine according to a value of the service activation flag whether a security service is active, and in response, if the service activation flag indicates that the security service is active, to modify the DNS reply message by replacing the target IP address with a dummy IP address. The communication manager is configured to intercept an electronic communication directed towards a destination IP address, to determine whether the destination IP address matches the dummy IP address, and in response, if the destination IP address matches the dummy IP address, to perform a computer security procedure according to the electronic communication. The communication manager is further configured, in response to determining whether the destination IP address matches the dummy IP address, if the destination IP address does not match the dummy IP address, to forward the electronic communication to the destination IP address.

According to another aspect, a server computer system engages in domain name service (DNS) transactions with a plurality of client systems, the server computer system comprising at least one hardware processor configured, in response to receiving a DNS query message from a client system of the plurality of client systems, the DNS query message comprising a target domain name, to identify the client system according to the DNS query message. The at least one hardware processor is further configured, in response to identifying the client system, to determine whether a client selection condition is satisfied according to the domain name and further according to an identity of the client system. The at least one hardware processor is further configured, in response to determining whether the client selection condition is satisfied, if the client selection condition is satisfied, to transmit a DNS reply message to the client system, the DNS reply message comprising a target Internet Protocol (IP) address associated with the target domain name, the DNS reply message further configured to include a service activation flag. The at least one hardware processor is further configured, in response to determining whether the client selection condition is satisfied, if the client selection condition is not satisfied, to transmit another DNS reply message to the client system, the other DNS reply message comprising the target IP address and further configured to not include the service activation flag. The client system is configured to interpret receiving the service activation flag as a trigger for performing a computer security procedure according to an electronic communication directed to or incoming from the target IP address.

BRIEF DESCRIPTION OF THE DRAWINGS

The foregoing aspects and advantages of the present invention will become better understood upon reading the following detailed description and upon reference to the drawings where:

FIG. 2-A shows a typical domain name service (DNS) transaction, as known in the prior art.

FIG. 2-B illustrates a modified DNS transaction according to some embodiments of the present invention.

FIG. 5-A shows an exemplary embodiment wherein a client device transmits forensic data to a security server, the forensic data comprising a digest of a network traffic between the client device and a content server.

FIG. 5-B shows an alternative embodiment wherein at least a part of the network traffic between the client device and content server is re-routed via the security server.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. A domain name is a label/alias identifying a network address. The term 'database' is used herein to denote any organized collection of data. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
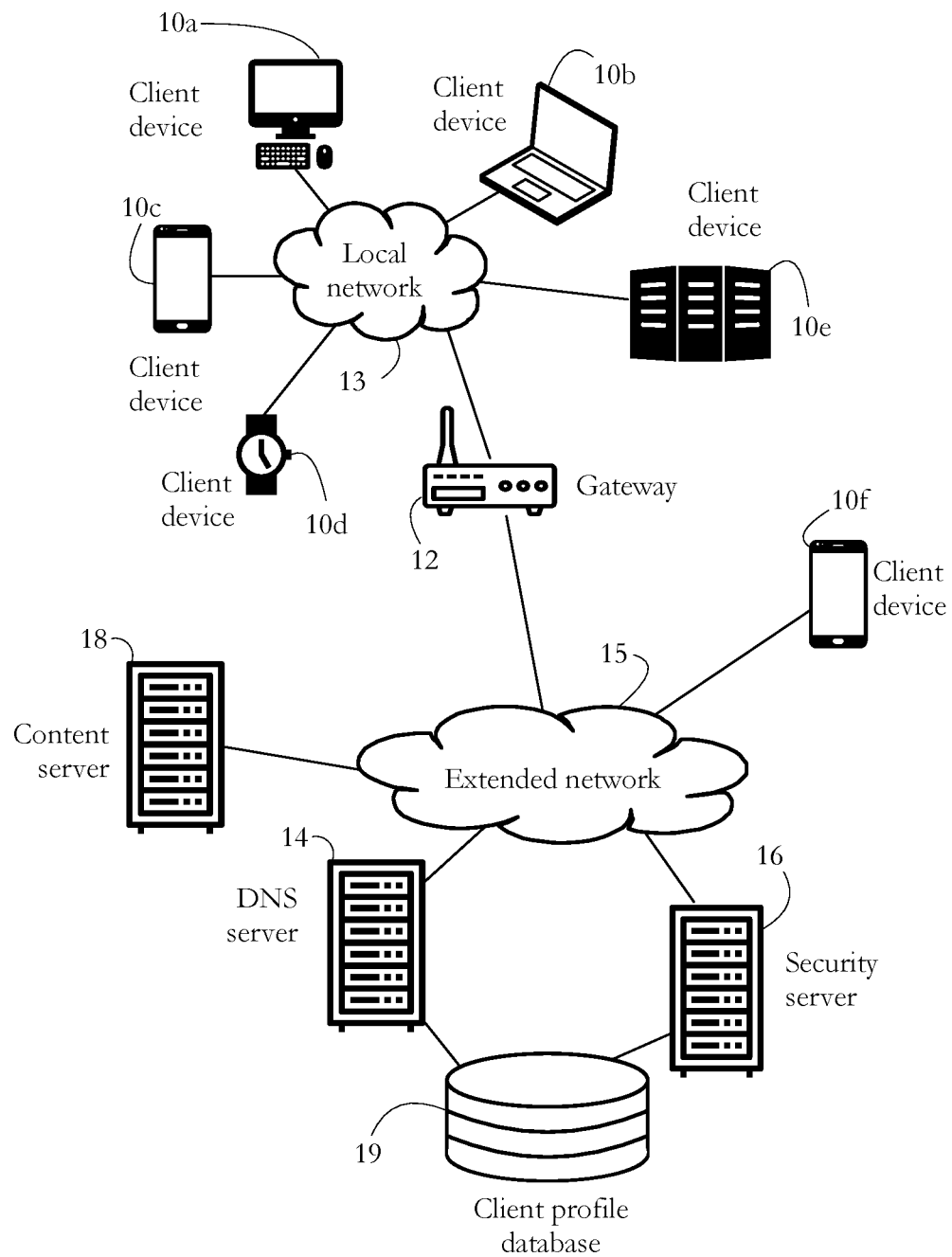
FIG. 1 shows an exemplary set of client devices protected against computer security threats according to some embodiments of the present invention.

FIG. 1 shows an exemplary set of client devices 10a-f protected from computer security threats according to some embodiments of the present invention. Exemplary client systems 10a-f include personal computer systems, corporate mainframe computers, mobile computing platforms (e.g., laptop computers, tablets, mobile telephones), entertainment devices (e.g., TVs, game consoles), wearable devices (e.g., smartwatches, fitness bands), household appliances (e.g., refrigerators, washing machines), and any other electronic device comprising a processor, a memory, and a communication interface enabling the respective device to communicate with other devices/computer systems. An exemplary client device may interact with a remote content server 18 over a communication link, to exchange data such as web content, electronic messages, various documents, etc.

In the exemplary configuration of FIG. 1, client devices 10*a-e* are interconnected by a local network 13, such as a local area network (LAN), home network, corporate network, etc. Devices 10*a-e* may further be connected to an extended network 15, such as a wide area network (WAN) and/or the Internet. In some embodiments, at least a part of network traffic between client devices 10*a-e* and extended network 15 traverses a gateway 12 such as a router or network hub. Another exemplary client device 10*f* may not be connected to local network 13, but instead connect to extended network 15, for instance by way of a mobile telephony network or a public WiFi hotspot.

In some embodiments, a domain name service (DNS) server 14 collaborates with a security server 16 to selectively harvest computer forensic data from client devices 10*a-f*, as shown in detail below. Such forensic data may include, for instance, metadata describing a data transmission between a selected client and a selected content server, and/or an actual payload of the respective data transmission. Metadata herein denote features of a transmission other than the transmission content or payload itself. Exemplary metadata includes, among others, network addresses of the sender and/or receiver, a size of the payload, and a timestamp indicating a real time of the respective transmission. The term 'forensic' is used herein to indicate that the respective data may be used for computer security purposes, for instance to determine whether the respective client system is infected with malicious software, or to prospectively identify network traffic patterns characterizing yet-unknown computer security threats. Each of servers 14-16 generically represents a set of communicatively-coupled computers, which may or may not be in physical proximity to each other. A skilled artisan will know that actions performed by servers 14-16 as described herein may be divided among multiple physical machines or processors.

Servers 14-16 are connected to a client profile database 19 and configured to access database 19 to carry out selective data insertion, data retrieval, and/or other database management operations. Database 19 is configured to store a plurality of client records related to client devices 10*a-f* and/or to the users of the respective client devices. In some embodiment, each client record corresponds to a distinct client device 10*a-f*. In one such example, a client record may store a set of identifiers of the respective client device (e.g. media access control—MAC address, International Mobile Equipment Identity—IMEI number, etc.), an indicator of a device type (e.g., digital camera, thermostat, smartphone, tablet computer, router, car), various hardware configuration indicators of the respective client device (e.g., whether the respective device has a camera, etc.), a list of software applications installed on the respective device, and an indicator of a geographical location of the respective client device. Other information stored in an exemplary client record comprises device usage data, such as statistics of network access by the respective client device, for instance the relative frequency of using various communication ports, relative traffic volume during various time intervals, etc. Other exemplary client records may include metadata describing network traffic transmitted or received by the respective client device. In some embodiments, such metadata may be organized according to a format such as IP Flow Information Export (IPFIX) from the Internet Engineering Task Force, or NetFlow® from Cisco, Inc. Database 19 may be formatted and stored according to any standard known in the art. Exemplary database formats include a relational database, an extensible markup language (XML) database, a spreadsheet, and a key-value store, among others.

In some embodiments, DNS server 14 provides domain name services to client devices 10*a-f*, the respective services comprising, inter alia, translating domain names into network addresses and/or vice versa. A typical data transmission between a client device and a remote content server comprises several steps. Such transmission requires knowledge of a network address (e.g., Internet Protocol—IP address) of the content server. Often, this address is not known to the client, for various reasons. For instance, there may be multiple mirror content server machines, and the client may be dynamically directed to the most convenient one according to the current load of each mirror server or according to the current geographical location of the client device. The client device may however know a domain name comprising an alias of the unknown network address. To establish a connection to the remote content server, a software entity executing on the respective client device may thus issue a request to access the respective domain name, instead of the IP address per se. In response, another software entity (e.g., the operating system) of the client device may attempt to translate the alias/domain name to an actual network address, and subsequently transmit the request to the correct network location. Such translation may invoke a DNS provider such as server 14 in FIG. 1. FIG. 2-A illustrates a typical exchange of messages according to a DNS protocol as known in the art. A client device 10 transmits a DNS query 22 to DNS server 14, query 22 comprising an encoding of a domain name. In response, DNS server 14 may return a DNS reply 24 to the requesting client, reply 24 including an encoding of a network address identified by the respective domain name/alias. Exemplary address encodings include IPv4 and IPv6 formats, among others.

Figure 3:
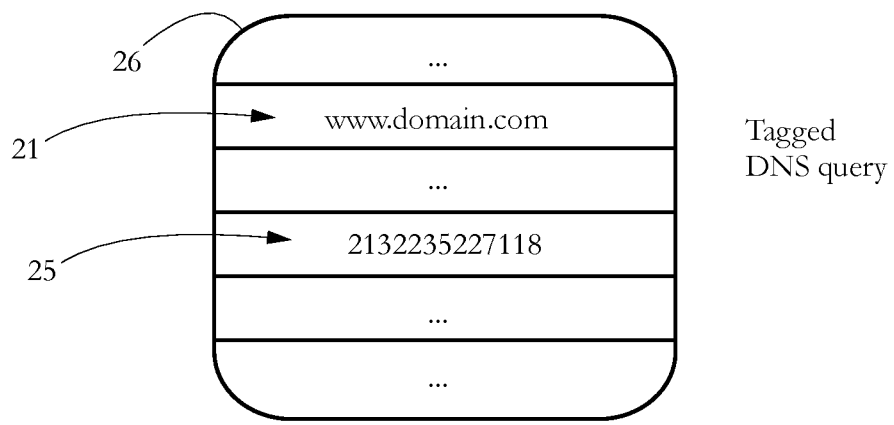
FIG. 3 shows an exemplary tagged DNS query according to some embodiments of the present invention.

FIG. 2-B shows an exemplary DNS exchange between client device 10 and DNS server 14 according to some embodiments of the present invention. In contrast to a conventional DNS exchange (FIG. 2-A), in some embodiments client device 10 may transmit a tagged DNS query 26 to DNS server 14, the tagged query comprising an identifier of the respective client device 10. An exemplary tagged query 26 is illustrated in FIG. 3 and includes an encoding of a domain name 21 and a client ID 25. Client ID 25 may comprise any item that enables distinguishing client device 10 from other client devices. Exemplary client ID's include a hash, a MAC address, an IMEI number, etc. In some embodiments, client ID 25 may not allow individually identifying client device 10, but is nevertheless indicative of a group identity of the respective client device. For instance, client ID 25 may selectively indicate a device group (e.g., devices within a certain department of a corporation, devices located within a certain network sub-domain, devices belonging to a certain home network, devices protected under a certain service contract), a device type (e.g., smartphones vs. desktop PCs vs. embedded), etc.

In an alternative embodiment, client ID 25 may comprise a digest of a client device profile. Exemplary device profile information may include, for instance, encodings of a device type, operating system, current geographical location, and an identifier of a current user of the respective client device. Such information may be used by DNS server 14 and/or security server 16 to select the respective client device for activation/de-activation of security services, as shown in more detail below.

Figure 4:
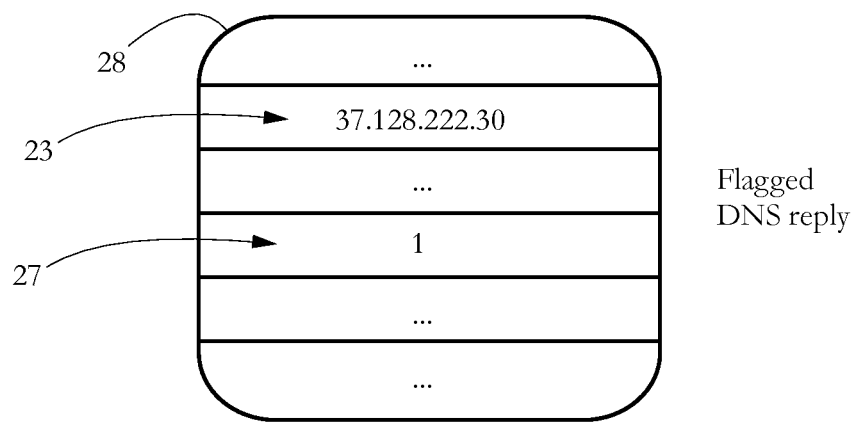
FIG. 4 shows an exemplary flagged DNS reply according to some embodiments of the present invention.

In response to receiving tagged DNS query 26, some embodiments of DNS server 14 return a flagged DNS reply 28, an example of which is shown in FIG. 4. Flagged DNS reply 28 includes an encoding of a network address 23 and a service activation flag 27 indicating whether a specific security service is active for the respective requesting client device 10. Exemplary security services selectively activated/de-activated by flag 27 include forensic data collection, parental control (e.g., limiting access of certain users to certain domains), application control (e.g., prohibiting certain applications from running, for instance Facebook®, instant messaging, gaming, etc.), anti-fraud, anti-malware, traffic introspection, etc.

In an alternative embodiment, flagged DNS reply 28 may include a plurality of service activation flags, for instance a bitmap wherein each bit represents a distinct security service (e.g., parental control, traffic introspection, forensic data collection, etc.) and the value of the respective bit indicates whether the respective service is turned on or off. In another example, flagged DNS reply 28 may include a set of service parameter values along with or instead of a simple service activation flag. In yet another example, distinct values of service activation flag 27 may indicate distinct modes of operation of the target client device. For instance, one value may instruct the client device to drop the respective traffic (e.g., interpret DNS reply 28 as a NXDomain reply), while another value may instruct the client device to force a timeout, or to redirect traffic to another IP address.

Data items like the client ID 25 and service activation flag 27 ID may be encoded and included in client queries and/or server reply messages using any method known in the art. Many current protocols/data formats used in electronic communication reserve a set of selected bits of each data packet for nonspecific use. Various embodiments may use such reserved bits to encode client ID 25 and/or service activation flag 27. In a simplest example, a selected bit of the respective message may act as service activation flag; a value of 1 may indicate that service is on, while a value of 0 may indicate that the service is off or that the respective message is not flagged. Some embodiments use DNS messages formatted according to a standard currently in use, such as the one described in the Internet Engineering Task Force (IETF) Request for Comments (RFC) 1035, among others. In one such example, client ID 25 and/or service activation flag 27 may be inserted as an additional resource record or pseudo-resource record of a DNS query or reply, e.g., as contents of a RDATA field.

In some embodiments, DNS server 14 may selectively activate/de-activate a security service by appropriately setting a value of service activating flag 27 only for certain client devices and/or users. The decision whether to turn a certain service on or off may be taken by security server 16 according to the identity of the client device issuing the respective tagged DNS query, and further according to criteria such as a current geographical location of the client device, a device type, a hardware and/or software profile of the respective client device. Examples of decision algorithms and criteria will be shown below. To enable such decision algorithms, some embodiments collect device profile information from client devices and transmit such profile information to security server 16, which may organize and store it in client profile database 19 (see FIG. 2-B).

Some embodiments use service activation flag 27 to selectively collect forensic data, as shown in more detail below. In response to selecting a client device as a target for data collection, DNS server 14 may respond to a DNS query received from the respective client device with a flagged DNS reply wherein service activation flag 27 is set to indicate that data collection is on. In response to receiving the respective flagged DNS reply, a security application executing on the selected client device may collect forensic information from the selected device and transmit the respective information to security server 16 for analysis. Forensic data collection may proceed according several scenarios. In one example illustrated in FIG. 5-A, security software executing on client device 10 may determine metadata and/or an actual payload of a communication between client device 10 and content server 18, package such information as forensic data 30, and add it to an outbound message queue for transmission to security server 16. In another example illustrated in FIG. 5-B, in response to receiving a flagged DNS reply indicating that data collection is active, security software executing on the respective client device may re-route at least a part of data traffic between client device 10 and content server 18 via a communication tunnel connecting client device 10 to security server 16. An example of such a tunnel is a virtual private network (VPN) connection. Stated otherwise, in FIG. 5-B, forensic data collection comprises routing live communications to and/or from the selected client device via security server 16, where the respective traffic may be analyzed.

Figure 6:
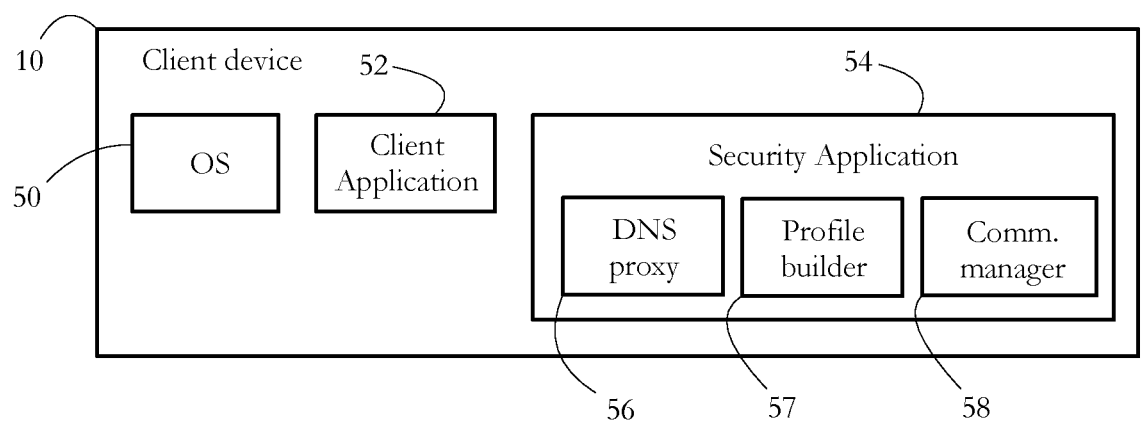
FIG. 6 illustrates exemplary software executing on a client device according to some embodiments of the present invention.

FIG. 6 shows exemplary software components executing on a client device according to some embodiments of the present invention. Such software may include an operating system (OS) 50, which may be any widely available operating system such as Microsoft Windows®, MacOS®, Linux®, iOS®, or Android®, among others. OS 50 provides an interface between the hardware of client device 10 and a set of applications including a client application 52 and a security application 54. Client application 52 generically represents any computer program such as a word processing application, spreadsheet application, image processing, gaming, electronic communication, web browsing, and social media application, among others. Security application 54 provides computer security services to client device 10, for instance anti-malware, intrusion detection, and network access control.

In some embodiments, security application comprises a DNS proxy 56, a profile builder 57, and a communication manager 58. Components 56-57-58 may execute as standalone executable entities, or may be incorporated into security application 54 for instance as dynamically loaded libraries. A skilled artisan will understand that some of the functionality of components 56-57-58 may be implemented on network gateway 12 (see FIG. 1), instead of client system 10.

In some embodiments, DNS proxy 56 is configured as an intermediary between client device 10 and DNS server 14, in the sense that DNS proxy 54 intercepts and modifies the flow and/or content of DNS messages going into and/or out of client device 10. Some embodiments configure OS 50 to selectively route outbound traffic to certain IP addresses via DNS proxy 56. Such functionality may be implemented for instance using a split-tunnel VPN. In one such example, security application 54 will register the IP address(es) of DNS server 14 with OS 50, thus declaring server 14 as the provider of DNS for the respective client system. Application 54 may further configure a VPN interface of client system 10 so that all traffic to the respective IP addresses will traverse DNS proxy 56.

Figure 7:
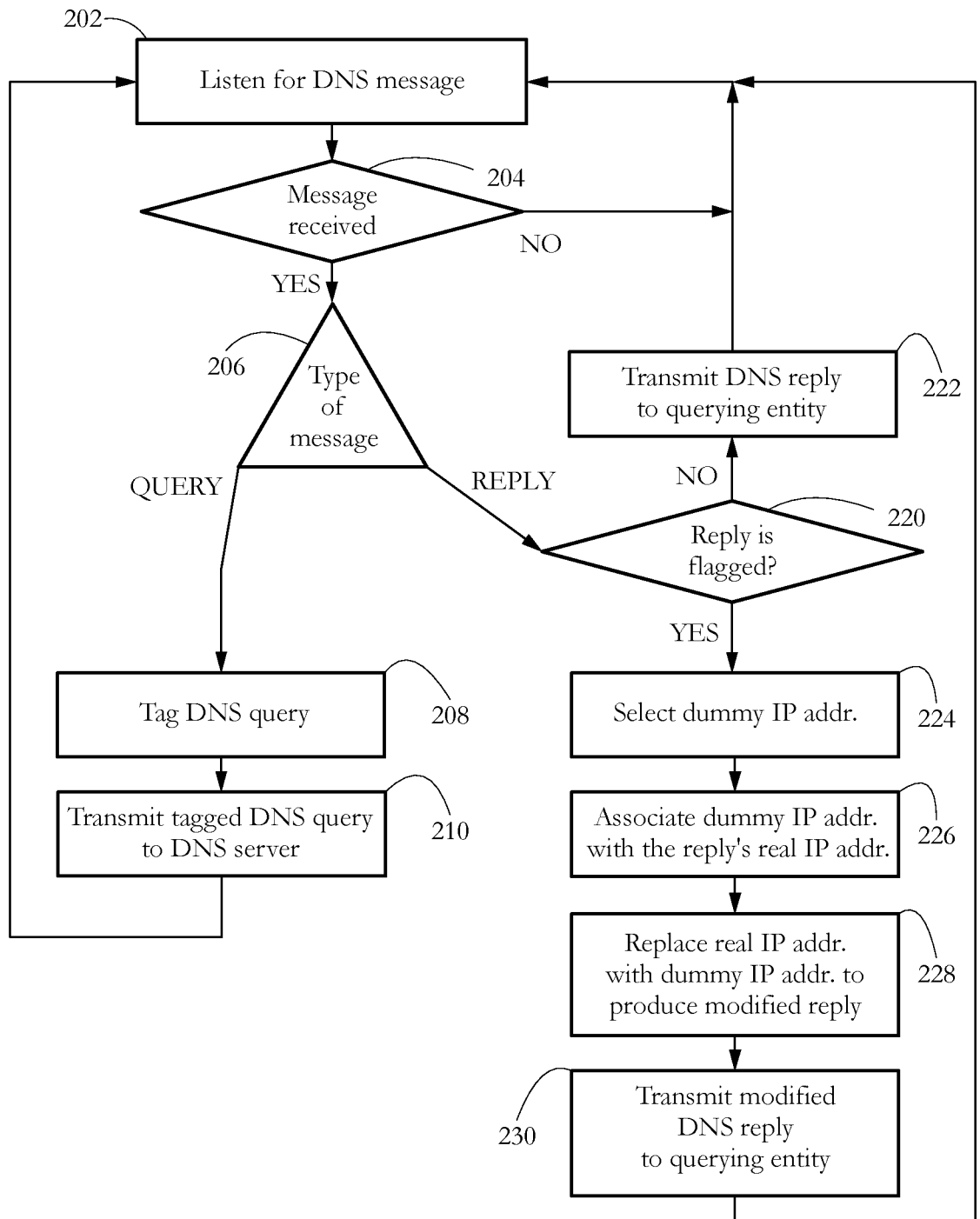
FIG. 7 shows an exemplary sequence of steps performed by a DNS proxy executing on the client device, according to some embodiments of the present invention.

FIG. 7 shows an exemplary sequence of steps performed by DNS proxy 56 according to some embodiments of the present invention. The exemplary algorithm described herein enables a selective processing of network access requests, wherein selection is achieved with the granularity of a single DNS request.

A sequence of steps 202-204 intercepts in- and outbound DNS messages. In a step 206, DNS proxy determines a type of the intercepted message. When the message is a DNS query (e.g., a request by client application 52 to access a certain domain name), in a sequence of steps 208-210, DNS proxy 56 tags the respective DNS query with a client ID of the respective client device to produce tagged DNS query 26, and transmits query 26 to DNS server 14.

When the intercepted DNS message is a reply, a step 220 parses the message to determine whether it is flagged or not, i.e., whether it contains a service activation flag, and whether the value of the flag indicates that a security service is active for the respective client device 10. When no, a step 222 forwards the respective DNS reply to the requesting software entity (e.g., client application 52 or OS 50).

In some embodiments, security application 54 maintains a pool of pre-determined dummy network addresses reserved for security purposes. Dummy addresses are herein used as substitutes for actual network addresses returned by DNS providers. A dummy address may or may not indicate a location of an actual online resource. Security application 54 maintains an address association table (e.g., a hash table) comprising a mapping between real and dummy addresses, as shown below. In some embodiments, security application 54 further registers dummy IP addresses with a VPN interface of client system 10, so that all traffic to and/or from such dummy addresses will traverse security application 54. This allows communication manager 58 to perform security operations on such traffic, for instance to redirect or introspect such traffic as further detailed below. Distinct dummy addresses may be used for distinct services, such as parental control, traffic sampling, access control, etc.

When the intercepted DNS message is a flagged reply wherein the value of the flag indicates that security services are active, in a step 224 an available dummy address is selected from the pool. Some embodiments select the dummy address further according to a value of service activation flag 27, for instance when different values indicate activation of different services. Next, DNS proxy 56 may create an association between the respective dummy address and the actual network address contained in the DNS reply (e.g., a hash table entry mapping the dummy address to the real address or vice versa). A further step 228 may edit the flagged DNS reply to replace the actual network address with the selected dummy address. In step 228, some embodiments further remove the service activation flag from the respective DNS message to make it look like a standard DNS reply. Such obfuscation strategies may help hide the actions of security software from potential malware executing on client device 10. A further step 230 transmits the modified DNS reply to the requesting software entity (e.g., client application 52 or OS 50).

Figure 8:
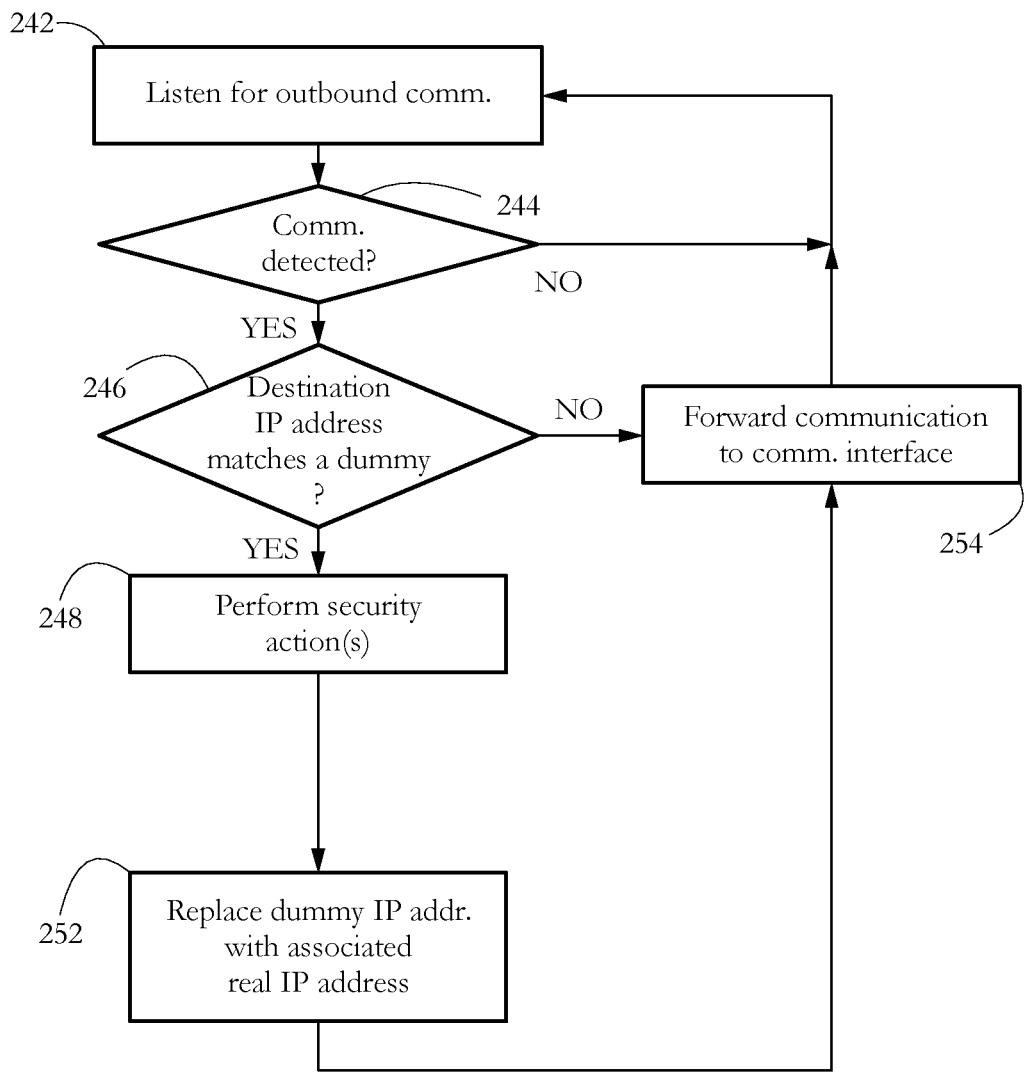
FIG. 8 shows an exemplary sequence of steps performed by a communication manager to process outbound communications, the communication manager executing on the client system according to some embodiments of the present invention.

In some embodiments, communication manager 58 intercepts and processes at least a part of the electronic communications between client device 10 and content server 18. As shown above, some embodiments configure security application 54 to intercept communications coming from and/or going out to a pre-determined set of IP addresses. FIG. 8 shows an exemplary sequence of steps performed by communication manager 58 to process outgoing communications, for instance hypertext transfer protocol (HTTP) requests to content server 18. When such a communication is detected (steps 242-244), a step 246 determines whether the destination IP address of the respective communication matches any of the list of dummy IP addresses maintained by security application 54. If no, communication manager 58 may forward the communication to a communication interface of client system 10 for transmission to its intended recipient.

If yes, indicating that the respective communication was selected for security processing, a step 248 performs some security actions according to the respective communication. Exemplary security actions include determining a set of metadata comprising, for instance, a real destination IP address associated with the respective dummy address, a communication port, a payload size, and a timestamp of the communication. Another security action may comprise making a copy of a payload of the respective communication. Yet another exemplary security action comprises inspecting a payload of the communication to determine whether the respective payload is encrypted or not, or whether the respective payload comprises a specific type of data (e.g., an image, executable code, etc.). In yet another example, step 248 comprises scanning a payload of the respective communication for malicious code. In some embodiments, step 248 further comprises placing the information extracted about/from the respective communication into a log or a queue for off-line transmission to security server 16. Some embodiments determine a type of security action according to the dummy address. For instance, some dummy addresses may indicate a parental control action, while another dummy address may indicate malware scanning.

In a further step 252, communication manager 58 may look up the address association table to determine a real IP address corresponding to the dummy address indicated by the respective communication, and edit the respective communication to replace the dummy address with the real IP address. In some embodiments, step 252 may further repackage the original communication to re-route it via a virtual private network tunnel to security server 16 (see FIG. 5-B). A step 254 may then forward the communication to the communication interface of client device 10.

Figure 9:
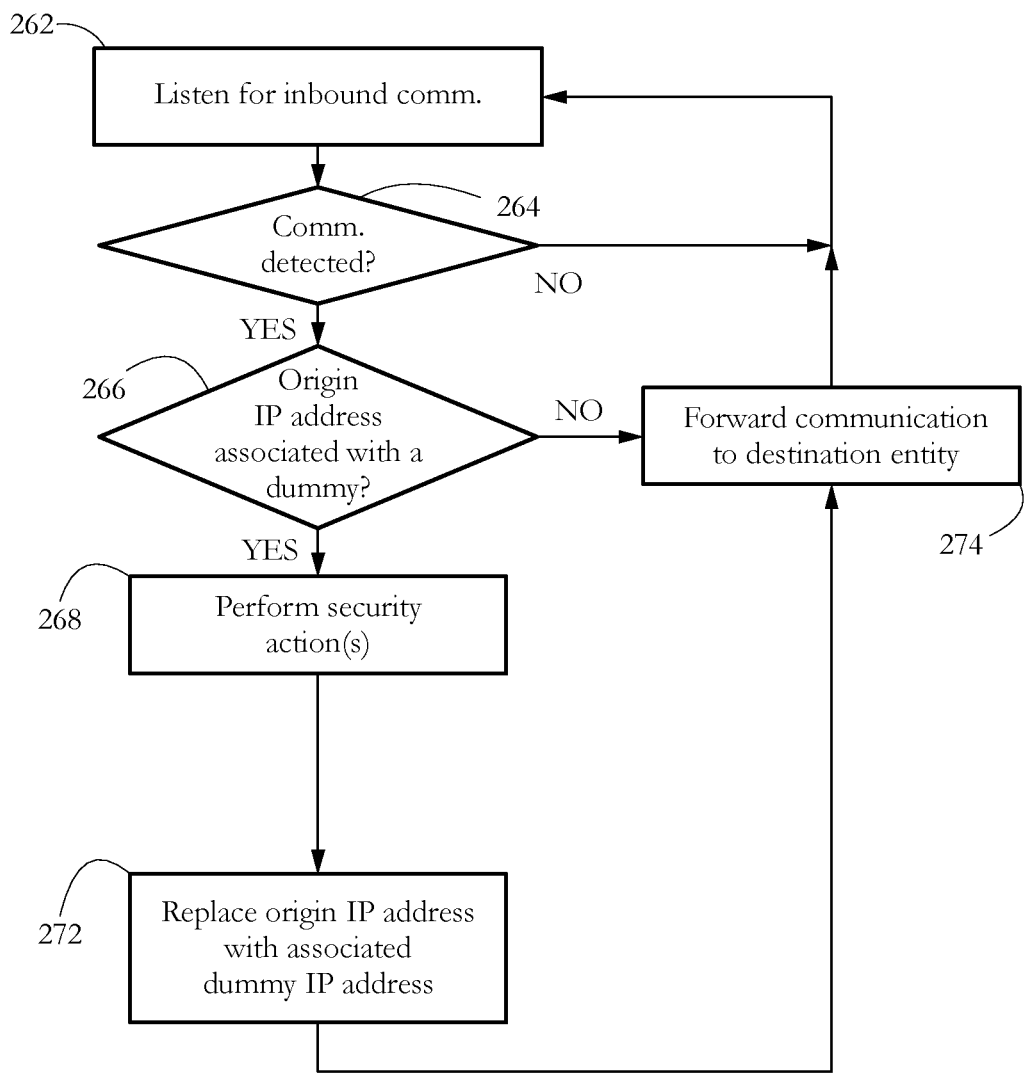
FIG. 9 shows an exemplary sequence of steps carried out by the communication manager to process inbound communications according to some embodiments of the present invention.

FIG. 9 shows an exemplary sequence of steps performed by communication manager 58 while processing incoming communications. When such a communication is received (steps 262-264), a step 266 may look up the address association table to determine whether the origin IP address of the communication matches a dummy address. If no, communication manager 58 may forward the incoming communication to its intended recipient (e.g., application 52).

If yes, indicating that the respective communication is selected for security processing, a step 268 performs a set of security actions according to the incoming communication. Exemplary security actions include determining a set of communication metadata (e.g., origin IP address, payload size, timestamp, etc.), copying a payload of the respective communication, inspecting the payload to determine a set of features (e.g., whether the respective payload is encrypted, whether it contains executable code, etc.), and scanning the respective payload for malware, among others. Some embodiments may further transmit such information to security server 16.

In a step 272, communication manager 58 may then edit the incoming communication to replace the origin IP address with the associated dummy IP address. A further step 274 may then forward the edited communication to its intended recipient (e.g., client application 52).

In some embodiments, profile builder 57 (FIG. 6) is configured to determine various features of the hardware and/or software configuration of client device 10, and to transmit such data in the shape of a profile indicator 29 to security server 16 (FIG. 2-B). Exemplary hardware features may include, for instance, a device type of the respective client device (e.g., smartphone, PC, tablet computer, thermostat), an identification feature (e.g., a MAC address, IMEI, etc.), hardware specifications of various components (e.g., manufacturer, model), an indicator of whether the respective client device 10 has a particular hardware component (e.g., camera, microphone, fingerprint reader, global positioning system—GPS sensor, etc.). Other exemplary hardware features include an amount of a resource currently being used (e.g., CPU throttle, RAM and disk usage, active screen time). Exemplary software features comprise, among others, a type and version of OS 50, a list of currently installed software applications, and statistical data indicative of how much each application is being used on the respective device. Profile indicator 29 may further include an indicator of a current geographical location of the client device (e.g., country, geolocation coordinates, etc.). In response to receiving profile indicator 29, security server 16 may store such information in client profile database 19. In some embodiments, client profile information is used to select a client device from a plurality of client devices for security services such as forensic data harvesting as described below. For instance, such profile information may provide clues about which devices may be infected with malicious software.

Figure 10:
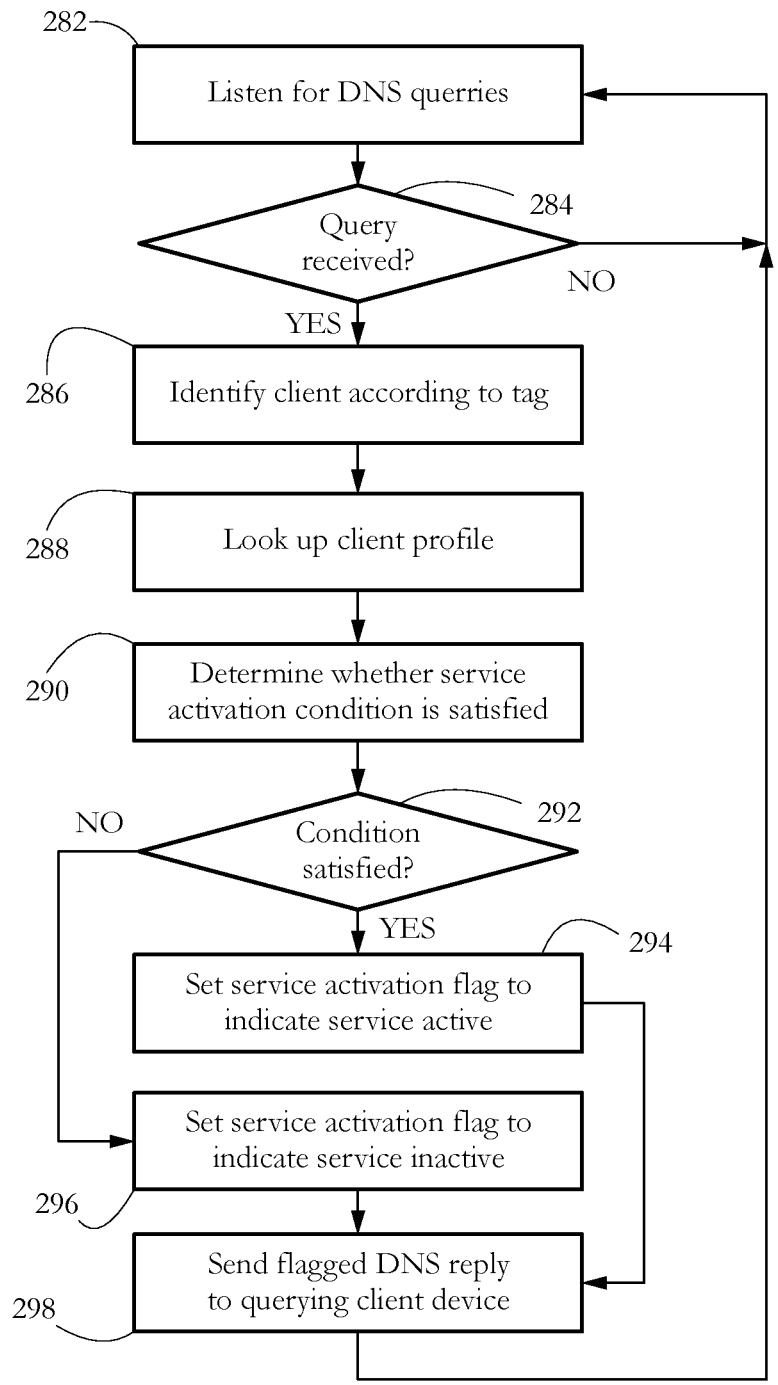
FIG. 10 shows an exemplary sequence of steps performed by the DNS server according to some embodiments of the present invention.

FIG. 10 shows an exemplary sequence of steps performed by DNS server 14 according to some embodiments of the present invention. A sequence of steps 282-284 listens for DNS queries. In some embodiments, such queries are tagged with a client identifier (see description above in relation to FIG. 7). When a query is received, a step 286 identifies the client device where the respective query originated according to client ID 25 (see e.g., FIG. 3). In a further step 288, DNS server 14 may look up a client profile of the respective client device in profile database 19.

A step 290 may further determine whether a service activation condition is satisfied for the current DNS query and the respective client device. Stated otherwise, in step 290 server 14 may selectively activate a security service for some clients and/or some domain names. Client selection may proceed according to client profile data retrieved from database 19. In an alternative embodiment wherein DNS proxy 56 sends client profile data encoded in tagged DNS query 26, server 14 may select the respective client device according to such data. In yet another embodiment, steps 288-290 are performed by security server 16, which then transmits a list of selected client devices to DNS server 14.

In an exemplary forensic data harvesting embodiment, DNS server 14 may select clients matching a specific device type (e.g., smartphones), clients from a specific region or country (e.g., Germany), clients running a particular operating system and/or version (e.g., Android, iOS 10), etc. Another exemplary client selection criterion comprises whether the respective client device is running a specific application, for instance unknown or suspect software. In one such example, HTTP requests to access IP addresses associated with specific domain names and received from devices running a specific monitored application will be copied or diverted via VPN to security server 16.

Other client selection criteria may include a count of client devices and/or DNS queries. For instance, DNS server 14 may select a pre-determined number of client devices during each time interval (e.g., no more than 100 distinct clients per second), or a pre-determined number of DNS queries (e.g., no more than 50 distinct DNS queries from the same client). In an embodiment as depicted in FIG. 5-B, wherein the client device may selectively re-route certain communications to security server 16 via a VPN tunnel according to a value of the service activation flag, another exemplary selection criterion includes a current load of the VPN service running on security server 16. In an exemplary parental control embodiment, another selection criterion may include the current user of the respective client device (e.g., activate parental control rules selectively, only while children are using the device). Individual selection criteria may be combined into complex criteria involving multiple conditions (e.g., 100 DNS requests received from distinct smartphones in Belgium and The Netherlands).

If a selection condition is satisfied for the client device that issued the current DNS query, a step 294 may formulate a flagged DNS reply by setting service activation flag 27 to indicate that a security service is active (see e.g., FIG. 4). In some embodiments, setting flag 27 to active effectively selects the respective client device for a specific security service such as forensic data collection, parental control, etc. Such selection is herein activated per DNS query, and can be turned off for subsequent queries received from the same client device.

When the selection conditions is not satisfied for the respective client device and current DNS query, a step 296 may formulate a flagged DNS reply by setting activation flag 27 to indicate that the security service is inactive. In an alternative embodiment, step 296 may formulate a standard DNS reply lacking service activation flag 27 altogether. A further step 298 may transmit the DNS reply formulated in either step 294 or 296 to the requesting client device.

Figure 11:
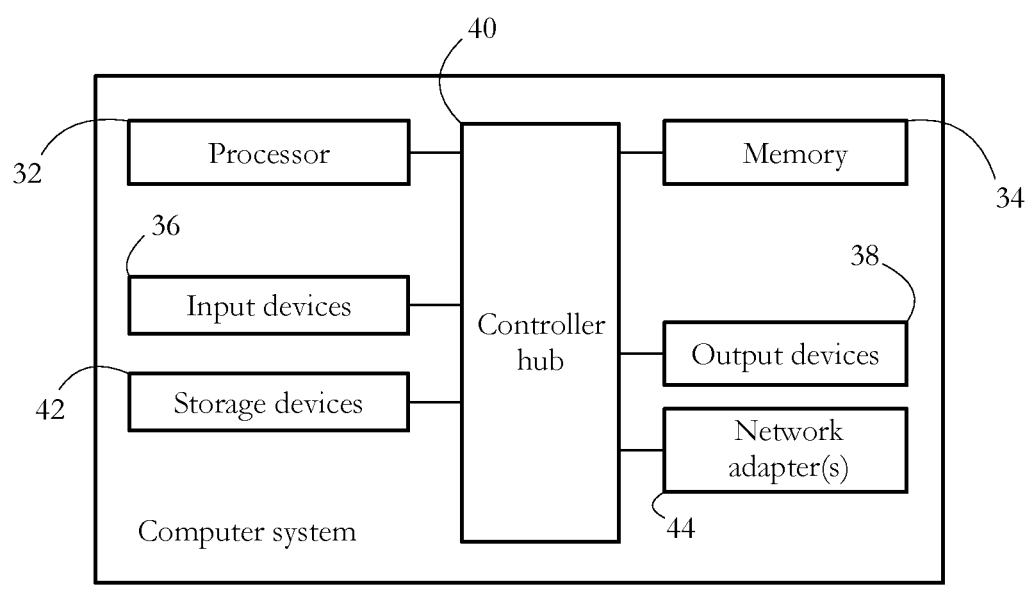
FIG. 11 illustrates an exemplary hardware configuration of a computer system programmable to carry out methods and algorithms according to some embodiments of the present invention.

The description above shows exemplary computer programs performing various methods according to some embodiments of the present invention. Such computer programs are typically executed by a multi-purpose hardware processor, but a skilled artisan will understand that the methods and algorithms disclosed herein may be implemented using dedicated hardware components, such as an application-specific integrated circuit (ASIC) or field-programmable gate array (FPGA). FIG. 11 illustrates an exemplary hardware configuration of a computer system programmable to carry out methods and algorithms described herein. FIG. 11 shows a generic computer system, which may represent, for instance, any of client devices 10*a-f,* DNS server 14, and security server 16, among others. A skilled artisan will understand that the hardware configuration of some client systems (e.g., mobile telephones, smartwatches) may differ somewhat from the one illustrated in FIG. 11.

The illustrated computer system comprises a set of physical devices, including a hardware processor 32 and a memory unit 34. Processor 32 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 32 in the form of a sequence of processor instructions (e.g. machine code or other type of encoding). Memory unit 34 may comprise volatile computer-readable media (e.g. DRAM, SRAM) storing instructions and/or data accessed or generated by processor 32.

Input devices 36 may include computer keyboards, mice, and microphones, among others, including the respective hardware interfaces and/or adapters allowing a user to introduce data and/or instructions into the respective computer system. Output devices 38 may include display devices such as monitors and speakers among others, as well as hardware interfaces/adapters such as graphic cards, allowing the illustrated computer system to communicate data to a user. In some embodiments, input devices 36 and output devices 38 share a common piece of hardware, as in the case of touch-screen devices. Storage devices 42 include computer-readable media enabling the non-volatile storage, reading, and writing of software instructions and/or data. Exemplary storage devices 42 include magnetic and optical disks and flash memory devices, as well as removable media such as CD and/or DVD disks and drives. The set of network adapters 44, together with associated communication interface(s), enables the illustrated computer system to connect to a computer network and/or to other devices/computer systems. Controller hub 40 represents the plurality of system, peripheral, and/or chipset buses, and/or all other circuitry enabling the communication between processor 32 and devices 34, 36, 38, 42, and 44. For instance, controller hub 40 may include a memory controller, an input/output (I/O) controller, and an interrupt controller, among others. In another example, controller hub 40 may comprise a northbridge connecting processor 32 to memory 34, and/or a southbridge connecting processor 32 to devices 36, 38, 42, and 44.

The exemplary systems and methods described above allow selectively performing computer security operations on heterogeneous clients such as personal computers and smartphones, as well as Internet of Things (IoT) devices like TVs, thermostats, refrigerators, and wearables, among others. Selectivity herein denotes the capability of precisely targeting a device from among a multitude of client devices and performing some security procedure on the respective device, as opposed to indiscriminately carrying out the respective security procedure on multiple client devices. In some embodiments, selection of target devices is centralized on a remote server computer system communicatively coupled to the multitude of client devices.

In some embodiments, a security application executes on each client device and comprises a domain name service (DNS) proxy that intercepts and processes DNS messages exchanged between the respective client device and a remote DNS server. For clarity and simplicity, the disclosure above used the term 'domain name service' to denote a conventional DNS as currently used in Internet communications. However, a skilled artisan will understand that the methods and systems described herein may be easily adapted to any other format and protocol for mapping a domain name to a network address or vice versa.

In some embodiments, the DNS proxy component tags outgoing DNS queries addressed to the DNS server with an identifier of the respective client device. In response, the DNS server may respond with a flagged DNS reply comprising a service activation flag. In some embodiments, the DNS server selects a particular client device for a security procedure by setting the service activation flag to a predetermined value when issuing a DNS reply to the respective client. In turn, the security application executing on the client may interpret some values of the service activation flag as a trigger for executing the respective security procedure. Distinct values of the flag may trigger distinct security procedures. In an alternative embodiment, the presence of a service activation flag in a DNS reply may trigger the security procedures, while the absence of such a flag may indicate to the security application not to carry out the respective procedures.

In view of the above, the exemplary systems and methods described above achieve a client selectivity at the level of individual DNS messages. Stated otherwise, security procedures may be turned on/off by any individual DNS exchange between the respective client device and the DNS server. In some conventional computer security applications, clients are selected for certain procedures according to individual client subscription options, or according to software configuration parameters. For instance, some clients may sign up for parental control, while others may not. Similarly, security software may divert via a VPN tunnel the traffic of some clients, but not others. However, such client selectivity is typically pre-determined and does not change in time, e.g., all access requests coming from a specific client are typically treated according to the same rule/procedure. In contrast to such conventional systems, some embodiments allow a more flexible client selection, done on a per-DNS message basis. This allows, for instance, to select a client for a specific procedure according to a schedule, according to a current server load, according to a domain name that the client is attempting to access, according to a current geographical location of the client (e.g. geofencing), etc.

Exemplary security procedures selectively activated according to some embodiments of the present invention include, among others, selectively harvesting forensic information from clients, selectively routing traffic via a security server, parental control (e.g., selectively monitoring and/or restricting access of certain clients/users to certain online content), application or access control (e.g., selectively monitoring and/or restricting a client's use of selected applications and/or communication protocols such as Facebook® and online messaging).

An important class of applications enabled or facilitated by some embodiments of the present invention rely on a selective harvesting of computer forensic data from clients. Such harvesting may be useful, for instance, for a timely discovery of emerging computer security threats such as malware. New malicious software appears all the time, and in the absence of information about its behavior, such software may bypass conventional security measures and spread rapidly. IoT devices are particularly vulnerable to such infections. It is therefore important to gather as much information as possible about emerging infections, and ideally to selectively gather such information from devices that are already infected. Some malware selectively infects a particular type of devices (e.g., mobile phones) and/or devices running a particular type of operating system (e.g., Android®). Some embodiments enable such selective targeting of clients, and therefore an efficient gathering of information for security purposes. In one such example, the DNS server may select a client device that fits the profile of a likely target for particular malware (e.g., a smartphone from a particular country). In response, security software executing on the selected client device may take a snapshot of data traffic going into/out of the respective client device. By enabling a per-DNS message selective activation of data harvesting, some embodiments allow gathering data traffic going out to or coming in from a specific Internet domain or network address of interest (e.g., a suspected command-and-control server).

An alternative embodiment of data harvesting may redirect to a security server a communication between a selected client device and a suspect Internet domain or network address. Such redirection may be enabled using a VPN tunnel, for instance. The security server may then introspect the redirected traffic for signs of malice. Re-routing and introspecting network traffic are known in the art of computer security. However, typical configurations re-route all traffic of a selected client, thus ensuring its permanent protection from online threats. Such massive re-routing network of traffic from thousands of protected clients to a handful of VPN servers is relatively expensive in terms of equipment costs and computation load and may negatively affect user experience on the client side. In contrast to such conventional systems, in some embodiments of the present invention, traffic of each client device may be selectively re-routed via VPN. For instance, in a data harvesting embodiment, only traffic to/from certain domains considered of interest may be re-directed to the VPN servers. In addition, the systems and methods described herein allow randomly sampling network traffic from a plurality of client devices that fit a specific profile (e.g., smartphones and tablet computers running iOS®). Such random sampling may ensure that no particular client device is disproportionately affected by data harvesting procedures, the overall impact on user experience being substantially lower that in conventional systems.

Some embodiments may use a flagged DNS reply as a trigger for gathering other forensic data. In one such example, in response to a flagged DNS reply, security software may determine parameters of a current state of the respective client device (for instance, getting the current value of various OS variables and/or registry keys, taking a snapshot of a specific section of memory, etc.). Such data may be transmitted to the security server and used in forensic investigations alongside network traffic data.

An exemplary use case scenario of the systems and methods described herein comprises pro-actively detecting spyware. An outbreak of new malware affecting devices running the Android® operating system was detected in Western Europe. The malicious code is delivered via the Google Play® Store, packaged as a genuine-looking photo organizer tool. However, a hidden intent of the application is to collect personal user data and submit it to a server. This technically qualifies as spyware.

Stage I—Triggering a Suspicion of Malice

Client devices protected according to some embodiments of the present invention submit various DNS queries and client profile information to DNS server 14 and/or security server 16 (see FIG. 2-B). Client profile indicator 29 may include a list of application currently installed on the device. Based on such information, the installation of an unknown application is detected. Furthermore, a record of DNS queries received from this client device reveals frequent access requests to the domain name upload_application_name.serviceprovider.com. Security server 16 runs a series of malware-identifying heuristics on the DNS logs, revealing that domain serviceprovider.com is registered by a platform as a service (PAS) provider, and that DNS queries for the respective domain come at relatively regular time intervals. These two facts trigger a suspicion of malice, and security server 16 decides to sample and/or introspect network traffic exchanged between the respective client device and the suspect domain.

Stage II—Traffic Analysis

To collect a representative traffic sample, security server 16 identifies a selected subset of client devices considered representative for this threat, according to device profiles stored in profile database 19. For instance, selection may be done according to the current location of candidate devices (e.g., Western European countries) and operating system (in this case, a specific version of Android®). Security server 16 may transmit the list of selected devices to DNS server 14. In response, DNS server 14 may flag at least some DNS replies to DNS queries comprising the serviceprovider corn domain and received from the selected clients, to indicate an activation of the forensic data collection service on the respective devices. In some embodiments, the value of service activation flag 27 instructs security software on the receiving client device to divert traffic to serviceprovider.com through VPN to security server 16. DNS server 14 will keep track for each selected client device, for instance recording how many DNS queries of serviceprovider.com were received from the respective client device, and will stop forensic data collection from the respective client device when sufficient traffic samples were collected. To stop data collection, DNS server 14 may reset service activation flag 27 to indicate that data collection service is inactive, or may respond with a standard DNS reply that lacks service activation flag 27 altogether.

In turn, in response to receiving a flagged DNS reply indicating that forensic data collection is active, security software executing on a client device replaces the real IP address corresponding to serviceprovider.com with a dummy IP address. Thereafter, when suspected malware attempts to communicate with serviceprovider.com, it will send a connection request to the dummy IP. Such a request may be re-routed through the VPN interface of the client device to security server 16. Re-routing typically comprises replacing the dummy IP address with the corresponding real destination IP address, and re-packing network traffic according to a VPN protocol. Some embodiments of security application 54 further attach some metadata (e.g., destination port, destination IP address, network protocol, timestamp, etc) to the diverted traffic.

In an exemplary traffic analysis scenario, a VPN component of security server 16 logs the metadata attached to each received network packet, and stores a copy of the packet payload to disk for later inspection. The packet itself is then forwarded to its true destination IP address. Any response packet from the respective IP address will be redirected back to the respective client device. In some embodiments, the VPN component of security server 16 will also log incoming traffic destined for the respective client device, thus capturing a complete exchange between the suspected malware and its remote service providers.

Using some of the systems and methods described herein, computer security analysts were able to collect the following types of information:
  telemetry to identify the outbreak of a new, potentially malicious application;
  a suspicious web service, identified by a suspect domain name; and
  samples of data exchanged between the new unknown application and the suspect domain name.

Using this data, the analysis team was able to apply heuristics to determine that the web service at the suspect domain is used for malicious command-and-control type communications. This exemplary determination of malice was made according to a timing and periodicity of packet exchanges, the fact that communications are encrypted, the identity of an owner of the encryption key, and an average size of communication payload (relatively small packets). Another set of heuristics identified the suspect domain as a malicious uploader (collector of user data), according to an asymmetry of the exchanges (payload of packets originating at the client device is typically much larger than payload of incoming packets), and to the fact that such asymmetric traffic was only seen on some infected clients, suggesting that the respective clients were somehow selected as interesting by the command-and-control server.

Several systems and methods of using DNS messages to selectively target individual clients for specific services are known in the art. However, in conventional systems and methods, typically the entity performing the respective service is the DNS server itself. In a parental control example, in response to receiving a DNS query tagged with a client identifier, a DNS server may selectively choose to return an IP address or not, according to the identity of the client and/or to the requested domain name. In a load-balancing example, the DNS server may choose among a plurality of IP addresses according to a current geographical position of the requesting client.

In contrast to such conventional systems, in some embodiments of the present invention security tasks are split between software executing on the DNS server and software executing on the client device. For instance, the task of selecting a client for a specific service is performed by the DNS server, which communicates to the requesting client device by way of a flagged DNS reply. In turn, security software executing on the client actually performs the respective service (e.g., forensic data collection, redirecting traffic to a security server, parental control, etc.). There are multiple advantages of such task splitting. On one hand, centralizing the decision process on a server allows for a unified management of security information and an optimal speed of response to emerging threats. On the other hand, executing security operations on the client itself allows for increased precision, sophistication, and flexibility of the respective operations. Virtually any operation can thus be carried out on a client, while benefitting from the advantages of per-DNS-message selection as described above. For instance, a selective redirection of a client's network traffic via VPN to a security server is feasible using the systems and methods described herein, while it cannot be done by the DNS server alone, i.e., using a conventional DNS-server-centric security model.

Although the description above primarily focused on embodiments wherein security software such as DNS proxy 56 and communication manager 58 execute on the end-client device (e.g., smartphone, PC), in alternative embodiments at least some of the functionality of DNS proxy 56 and/or manager 58 may be implemented on a network appliance acting as gateway to a local network interconnecting multiple client devices. See, for instance, gateway 12 in FIG. 1. In such configurations, gateway 12 may intercept DNS messages going into and/or out of local network 13, and may modify them as shown above. When gateway 12 supplies local network addresses to clients (e.g. acting as DHCP server for local network 13), gateway 12 distinguishes among individual client devices, and can therefore tag outgoing DNS queries with a respective client identifier. Furthermore, gateway 12 is in a good position to intercept and selectively route other electronic communications (e.g., HTTP requests) between clients on the local network and external IP addresses. Therefore, gateway 12 may execute security procedures as shown herein, for instance selectively harvesting forensic data, performing parental control activities, etc.

Some embodiments implement a hybrid configuration, wherein some of the client devices 10a-f execute an instance of security application 54, while others do not. In one such example, gateway 12 may attempt to automatically provision security application 54 to all client devices 10a-e connected to local network 13. Some such devices, for instance thermostats, smartwatches, etc., may have limited hardware resources and therefore may be unable to execute a full-blown instance of security application 54. Some embodiments may then use software executing on gateway 12 to extend security services as described herein to such devices.

There may be multiple advantages to running at least a part of the functionality of security application 54 on gateway 12, as opposed to on end-client devices 10a-f as shown above. One advantage is that operations carried out on gateway 12 (such as tagging DNS requests, detecting service activation flags, modifying IP addresses, etc.) are virtually undetectable by software executing on client devices. Furthermore, malware executing on client devices may not interfere with or subvert the activity of gateway 12. Another advantage is that gateway 12 may efficiently collect and/or introspect data traffic by itself, i.e., without re-directing the respective traffic to a VPN server. In one such example, gateway 12 may determine traffic metadata (e.g., origin and destination IP addresses, packet size, timestamps), and transmit such metadata to security server 16 for analysis.

Yet another advantage of configurations wherein at least a part of security application 54 executes on gateway 12 is insight into local network topology. In the example of FIG. 1, DNS server 14 is typically not aware that client devices 10a and 10b are connected to the same local network, but gateway 12 is. Therefore, when intercepting multiple DNS queries for the same domain name, gateway 12 may inform server 14 whether the respective DNS queries are coming from members of the same network or not. Such information is potentially relevant to computer security, for instance in situations wherein malware spreads from one network node to others. In another exemplary situation, multiple DNS queries for the same domain name coming from distinct device types (smartphone, PC, TV) connected to a home network may indicate legitimate usage of an online entertainment service such as Spotify® or Netflix®. In yet another example, multiple DNS queries for the same domain name coming from devices running the same OS (e.g., Windows®) may indicate a legitimate attempt to distribute a software update to multiple devices on a corporate network.

However, running at least a part of security application 54 on gateway 12 as opposed to individual client devices also has disadvantages. For instance, automatic device discovery (i.e., using software executing on gateway 12 to determine a device type of each client 10a-f) may be limited and computationally costly. Although some type-indicative client information may be available in the form of MAC addresses, etc., other data such as resource usage and installed software may be completely inaccessible to gateway 12.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a computer system to:
    intercept a domain name service (DNS) reply message received at the computer system, the DNS reply message comprising a target internet protocol (IP) address indicating a network location of a remote resource, the DNS reply message further comprising a service activation flag;
    determine according to a value of the service activation flag whether a forensic data collection service is active;
    in response, if the service activation flag indicates that the forensic data collection service is active, modify the DNS reply message by replacing the target IP address with a dummy IP address;
    intercept an electronic communication directed towards a destination IP address;

determine whether the destination IP address matches the dummy IP address; and in response to determining whether the destination IP address matches the dummy IP address, if the destination IP address matches the dummy IP address, perform a forensic data collection procedure for characterizing emerging malware, the forensic data collection procedure comprising transmitting a set of metadata characterizing the electronic communication to a remote security server.

2. The method of claim 1, wherein performing the forensic data collection procedure further comprises employing the at least one hardware processor to re-route the electronic communication via a tunnel connecting the computer system to the remote security server.

3. The method of claim 1, wherein the set of metadata includes the target IP address and a timestamp of the electronic communication.

4. The method of claim 3, wherein the set of metadata further comprises an indicator of a size of a payload of the electronic communication.

5. A computer system comprising at least one hardware processor configured to execute a domain name service (DNS) proxy and a communication manager, wherein:

the DNS proxy is configured to:
intercept a DNS reply message received at the computer system, the DNS reply message comprising a target internet protocol (IP) address indicating a network location of a remote resource, the DNS reply message further comprising a service activation flag,
determine according to a value of the service activation flag whether a forensic data collection service is active, and
in response, if the service activation flag indicates that the forensic data collection service is active, modify the DNS reply message by replacing the target IP address with a dummy IP address; and the communication manager is configured to:
intercept an electronic communication directed towards a destination IP address, determine whether the destination IP address matches the dummy IP address, and
in response to determining whether the destination IP address matches the dummy IP address, if the destination IP address matches the dummy IP address, perform a forensic data collection procedure for characterizing emerging malware, the forensic data collection procedure comprising transmitting a set of metadata characterizing the electronic communication to a remote security server.

6. The method of claim 1, wherein performing the forensic data collection procedure further comprises employing the at least one hardware processor to re-route the electronic communication via a tunnel connecting the computer system to the remote security server.

7. The computer system of claim 5, wherein the set of metadata includes the target IP address and a timestamp of the electronic communication.

8. The computer system of claim 7, wherein the set of metadata further comprises an indicator of a size of a payload of the electronic communication.

9. A non-transitory computer-readable medium storing instructions which, when executed by at least one hardware processor of a computer system, cause the computer system to form a domain name service (DNS) proxy and a communication manager, wherein:

the DNS proxy is configured to:
intercept a DNS reply message received at the computer system, the DNS reply message comprising a target internet protocol (IP) address indicating a network location of a remote resource, the DNS reply message further comprising a service activation flag,
determine according to a value of the service activation flag whether a forensic data collection service is active, and
in response, if the service activation flag indicates that the forensic data collection service is active, modify the DNS reply message by replacing the target IP address with a dummy IP address; and the communication manager is configured to:
intercept an electronic communication directed towards a destination IP address, determine whether the destination IP address matches the dummy IP address, and
in response to determining whether the destination IP address matches the dummy IP address, if the destination IP address matches the dummy IP address, perform a forensic data collection procedure for characterizing emerging malware, the forensic data collection procedure comprising transmitting a set of metadata characterizing the electronic communication to a remote security server.

10. A server computer system comprising at least one hardware processor configured to engage in domain name service (DNS) transactions with a plurality of client systems, and further configured to:

in response to a determination that an Internet domain is suspected of malice, determine a target device profile according to the Internet domain, the target device profile collectively representing electronic devices characterized by being located within a selected geographic area and executing a selected operating system;

in response to receiving a DNS query message comprising the Internet domain, identify according to the DNS query message a client system where the DNS query message originated;

in response to identifying the client system, determine whether the client system matches the target device profile;

in response to determining whether the client system matches the target device profile, when the client system matches the target device profile, transmit a DNS reply message to the client system, the DNS reply message comprising a target Internet Protocol (IP) address associated with the domain name, the DNS reply message further configured to include a service activation flag; and in response to determining whether the client system matches the target device profile, when the client system does not match the target device profile, transmit another DNS reply message to the client system, the other DNS reply message comprising the target IP address and further configured to not include the service activation flag;

wherein the client system is configured to interpret receiving the service activation flag as a trigger for performing a forensic data collection procedure according to an electronic communication directed to or incoming from the target IP address.

11. The server computer system of claim 10, wherein the at least one hardware processor is further configured to:

in response to determining whether the client system matches the target device profile, when the client system matches the target device profile, determine whether the client system is eligible for forensic data collection according to a count of DNS query messages previously received from the client system; and in response, transmit the DNS reply message including the service activation flag only when the client system is eligible for forensic data collection.

12. The server computer system of claim 10, wherein the at least one hardware processor is further configured to:
in response to determining whether the client system matches the target device profile, when the client system matches the target device profile, determine whether the client system is eligible for forensic data collection according to a count of DNS query messages including the domain name previously received at the server computer system; and
in response, transmit the DNS reply message including the service activation flag only when the client system is eligible for forensic data collection.

13. The server computer system of claim 10, wherein the at least one hardware processor is further configured to:
in response to determining whether the client system matches the target device profile, when the client system matches the target device profile, determine whether the client system is eligible for forensic data collection according to a count of distinct client systems having transmitted DNS query messages to the server computer system within a selected time interval; and
in response, transmit the DNS reply message including the service activation flag only when the client system is eligible for forensic data collection.

14. The server computer system of claim 10, wherein the at least one hardware processor is further configured to:
in response to determining whether the client system matches the target device profile, when the client system matches the target device profile, lookup a client profile database to determine whether a selected software application is installed for execution on the client system; and
in response, transmit the DNS reply message including the service activation flag only when the selected software application is installed for execution on the client system.

15. The server computer system of claim 10, wherein the at least one hardware processor is further configured to:
in response to determining whether the client system matches the target device profile, when the client system matches the target device profile, randomly select the client system for forensic data collection; and
in response, transmit the DNS reply message including the service activation flag only when the client system is selected for forensic data collection.

16. The server computer system of claim 10, wherein the target device profile represents electronic devices further characterized by being of a selected appliance type.

17. The server computer system of claim 10, wherein the at least one hardware processor is further configured to identify the client system according to a client ID included in the DNS query message, the client ID uniquely identifying the client system among the plurality of client systems.

18. The server computer system of claim 17, wherein the client ID comprises a hash value.

19. The method of claim 1, wherein the forensic data collection procedure further comprises transmitting an indicator of a current state of a client system selected from the plurality of client systems according to whether the electronic communication originated at the client system.

20. The computer system of claim 5, wherein the forensic data collection procedure further comprises transmitting an indicator of a current state of a client system selected from the plurality of client systems according to whether the electronic communication originated at the client system.

* * * * *